United States Patent
Simon et al.

(10) Patent No.: US 11,306,865 B1
(45) Date of Patent: Apr. 19, 2022

(54) QUICK CONNECT HAVING A SECURED POSITION AND A RELEASE POSITION

(71) Applicant: Russ Bassett Corporation, Whitter, CA (US)

(72) Inventors: Trevor Simon, Lake Forest, CA (US); Sasha Johnson, Fullerton, CA (US)

( * ) Notice: Subject to any disclaimer, the term of this patent is extended or adjusted under 35 U.S.C. 154(b) by 732 days.

(21) Appl. No.: 16/016,034

(22) Filed: Jun. 22, 2018

Related U.S. Application Data

(60) Provisional application No. 62/572,989, filed on Oct. 16, 2017, provisional application No. 62/523,737, filed on Jun. 22, 2017.

(51) Int. Cl.
   *F16M 13/02* (2006.01)

(52) U.S. Cl.
   CPC .................... *F16M 13/02* (2013.01)

(58) Field of Classification Search
   CPC ...... F16M 13/02; F16M 11/06; F16M 11/041; Y10S 248/917; Y10S 248/92; A47B 2097/005
   See application file for complete search history.

(56) References Cited

U.S. PATENT DOCUMENTS

| | | | |
|---|---|---|---|
| 5,352,033 A | 10/1994 | Gresham et al. | |
| 6,418,010 B1 | 7/2002 | Sawyer | |
| 6,801,426 B2 * | 10/2004 | Ichimura | F16M 11/08 248/349.1 |
| 7,286,342 B2 | 10/2007 | Yang | |
| 7,392,965 B2 | 7/2008 | Jung | |
| 7,395,992 B2 | 7/2008 | Jung | |
| 7,522,047 B2 | 4/2009 | Belden, Jr. et al. | |
| 7,673,838 B2 * | 3/2010 | Oddsen, Jr | F16M 11/041 248/278.1 |
| 7,905,460 B2 | 3/2011 | Woods et al. | |
| 8,132,765 B2 | 3/2012 | Liu | |
| 8,196,884 B2 | 6/2012 | Chiang | |
| 8,540,198 B2 | 9/2013 | Keyvanloo | |
| 8,814,108 B2 | 8/2014 | Bernstein | |
| 9,128,668 B2 | 9/2015 | Johnson | |
| 9,277,659 B2 * | 3/2016 | Onda | F16M 11/38 |
| 9,307,124 B2 | 4/2016 | Chen | |
| 9,307,848 B2 | 4/2016 | Bernstein | |
| 2002/0117595 A1 | 8/2002 | Bierjon | |

(Continued)

FOREIGN PATENT DOCUMENTS

| | | | |
|---|---|---|---|
| CN | 205823805 U | * | 12/2016 |
| JP | 2016080172 | * | 5/2016 |

(Continued)

OTHER PUBLICATIONS

Vidabox Kiosks 360 tilting VESA surface mount sold on amazon. com; first available date: Feb. 13, 2015 https://www.amazon.com/360-Tilting-VESA-Surface-Mount/dp/B00PUMLWAU?th=1 (Year: 2015).*

*Primary Examiner* — Terrell L McKinnon
*Assistant Examiner* — Ding Y Tan
(74) *Attorney, Agent, or Firm* — The Law Office of Austin Bonderer, PC; Austin Bonderer

(57) ABSTRACT

A quick connect is described. The quick connect has an alignment plate, a lock plate, and an alignment plate. The alignment plates has one or more projections. The lock plate has one or more fasteners. The alignment plate and the lock plate are coupled together and capable of rotation relative to each other.

19 Claims, 14 Drawing Sheets

(56) References Cited

U.S. PATENT DOCUMENTS

| | | | | |
|---|---|---|---|---|
| 2004/0257805 | A1* | 12/2004 | Lee | F16M 11/32 |
| | | | | 362/655 |
| 2005/0161575 | A1* | 7/2005 | Friederich | F16M 11/043 |
| | | | | 248/519 |
| 2014/0265764 | A1* | 9/2014 | Grziwok | G06F 1/1656 |
| | | | | 312/223.1 |
| 2014/0339385 | A1* | 11/2014 | Boer | B64D 47/00 |
| | | | | 248/222.52 |
| 2016/0157636 | A1 | 6/2016 | Shea | |
| 2019/0186517 | A1* | 6/2019 | Johnson | F16B 37/046 |

FOREIGN PATENT DOCUMENTS

| | | | | |
|---|---|---|---|---|
| KR | 20110070019 | * | 6/2011 | |
| TW | M 399560 U1 | * | 3/2011 | |
| WO | WO-2012159034 A1 | * | 11/2012 | F16M 11/2028 |

* cited by examiner

QUICK CONNECT HAVING A SECURED POSITION AND A RELEASE POSITION

FIELD

The subject matter herein generally relates to quick connect systems. In some embodiments, the system can be used for visual displays, monitors, and television.

BACKGROUND

There are many quick release mechanisms on the market for monitors and other devices. The common way to achieve a quick release is to have mating parts engage vertically, utilizing gravity. Some are flexible fingers, some are levers, and some are just fasteners relying on gravity to maintain engagement.

These designs have multiple issues. The engagement fingers or levers are generally small and near the engagement point, making them inaccessible from the front of the monitor. The vertical engagement and disengagement motion makes it difficult if not impossible to remove a bottom monitor without first removing the upper monitor in stacked monitor applications. Since these mechanisms snap into place vertically with gravity, there is no clamping function to hold the mechanism together rigidly, making the connection feel loose and wobbly. To disengage a monitor (or device) from a gravity disconnect mechanism, you have to lift the monitor off the engagement fingers. Since these are commonly used on articulating monitor arms that have counterbalanced height adjustment, the monitor has to first rise to the top of the stroke of the adjustable arm, then further to disengage the mechanism. Many of these mechanisms have small engagement features with little or no lead-in, making it difficult to install the monitor from the front without being able to see the mechanism.

BRIEF DESCRIPTION OF THE DRAWINGS

Implementations of the present technology will now be described, by way of example only, with reference to the attached figures, wherein.

DETAILED DESCRIPTION

Figure 1:
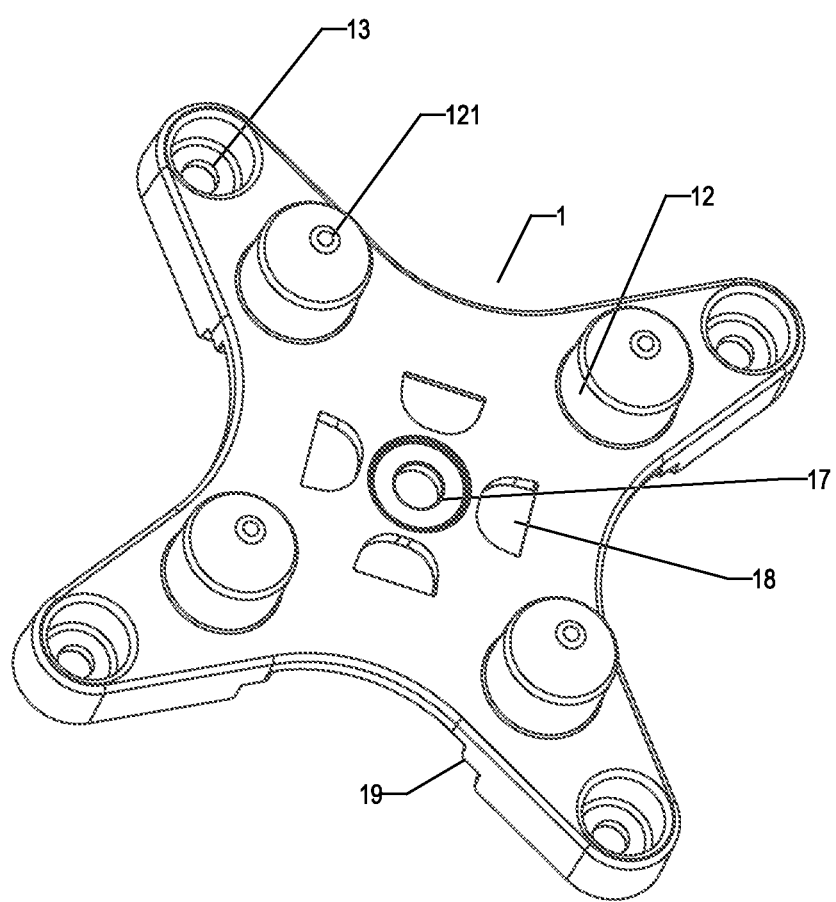
FIGS. 1 and 2 show an embodiment of an alignment plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a quick connect to be used with a monitor. However, it is understood that the quick connect can be used with any number of items.

Some embodiments create a mechanism that can engage and disengage by pushing and pulling straight from the front without having to lift the monitor. This allows any monitor in a multi-monitor arrangement to be removed and re-installed without having to move or remove any surrounding monitors. The engagement and disengagement can be performed from the front without having to see the mechanism or the back of the monitor. This easing of install and removal is done while maintaining overall stability once engaged and resistance to accidental disengagement.

A mounting Plate 4 which is mounted to the object can have securing holes 41. In some embodiments, the securing holes 41 can have a pattern that adheres to standardized formats (e.g., VESA). A Lock Plate 3 with fasteners 31 is configured to engage and secure the Mounting Plate 4. An Alignmen4t Plate 1 is located between the lock plate 3 and the mounting plate 4. The alignment plate 1 serves to align the mounting plate 4. A Lever 2 is used to provide a means for rotating the lock plate 3 in relation to the mounting plate 4.

The lock plate 3 has one or more fasteners 31 in a pattern to be inserted inside the engagement holes 42 and engage the mounting plate 4. The one or more fasteners 31 provides a secure and stable connection. In some embodiments, there are four fasteners 31 and four engagement holes 42.

The lock plate 3 also has one or more springs 32. In some embodiments, the springs 32 are projections 12 that act as living springs 32 to force rotation of the lock plate 3 against the alignment plate 1 to a secured position. In some embodiments, the springs 32 are protected from over-compression by stepped features 19 on the alignment plate 1 that stop the rotation of the lock plate 3, by abutting the alignment plate 1, before the springs 32 are over actuated. It is understood that many types of springs 32 can be used to bias the lock plate 3 to a secured position.

In some embodiments, a sleeve or guides 34 on the back of the lock plate 3 can secure the lever 2. In some embodiments, the lever 2 comprises depressions or holes 21 that provide effective incremental lengths for lever 2 location. The variable effective lever 2 length allows for lever 2 length to accommodate various monitor sizes and varying vertical mounting locations for the mounting plate 4. In some embodiments with the sleeve, or guides 34, the sleeve is open at the top and bottom so that the lever 2 can pass through as needed and can be inserted in either the top or the bottom. It is understood that the lever 2 can also extend horizontally. The lever 2 can be inserted at the bottom for a bottom-mounted monitor, at the top for a top-mounted monitor, and on the side when desired so that the lever 2 is always readily available from the front. In some embodiments, the lever 2 can only be inserted in one direction into the sleeve. In other embodiments, the lever 2 can be inserted in more than one direction. In some embodiments, the lever 2 is positioned so that it is mostly hidden but within reach of a user near the top or bottom of the monitor, and actuating the lever 2 releases the mounting plate 4 from the fasteners 31. In some embodiments, the fasteners 31 are in a pinwheel orientation, so that rotation of the lock plate 3 (via the lever 2) will disengage the fasteners 31 and allow the lock plate 3 to separate from the mounting plate 4. The lock plate 3 can be limited in movement so that it will only rotate in one direction from its secured position to a release position. This limiting of movement can be caused by the stepped features 19 abutting the lock plate 3.

In some embodiments, the lever 2 it an integral part of the lock plate 3 or secured to the lock plate 3 such that the length of the lever 2 is permanent or not easily adjustable.

The alignment plate 1 serves to align the mounting plate 4. In some embodiments, the lock plate 3 coupled to the alignment plate 1 in such a manner that relative movement is possible. There can be a hub 38, which can include a snap feature 39, in the center. Other attachments between the lock plate 3 and the alignment plate 1 can be provided as long as the fasteners 31 can disengage the mounting plate 4 in response to the actuation of the lever 2. The alignment plate 1 comprises one or more projections 12 that are inserted inside the alignment holes 43 in the Mounting Plate 4. In some embodiments, there are reliefs 18 in the alignment plate 1 that provide space for the flexible engagement members 33 to flex as the lever 2 is linearly moved into position. In some embodiments, the one or more projections 12 comprise lead-in features 121 at the distal ends to aid in inserting the one or more projections 12 inside the alignment holes 43. In some embodiments, the lead-in feature 121 is a frusto-conical shape. In embodiments with two or more projections 12, the fact that there are two projections 12 keeps the mounting plate 4 from rotating in relation to the alignment plate 1 to rotate as the springs 32 of the lock plate 3 are compressed. In some embodiments, the one or more projections 12 comprise ribs that correspond with guides 34 in the alignment holes 43 (not shown). The ribs can help limit rotation of the mounting plate 4. In some embodiments, the cross-sectional shape of the one or more projections 12 are polygons that have the same, or different (not shown), cross-sections if there are more than one. In some embodiments, there is one projection 12 that is substantially a cylinder with ribs on the outside thereof (not shown).

During use of some embodiments, the lock plate 3 is secured to the alignment plate 1, and the mounting plate 4 is secured to the mounted item 8. The one or more alignment holes 43 are slid inside the one or more projections 12. Once the mounting plate 4 is slid far enough, the fasteners 31 will engage the mounting plate 4. In some embodiments, the fasteners 31 will comprise a slanted 311 portion such that the fasteners 31 will abut the edge of the engagement holes 42 in the mounting plate 4, the edge will slide along the slanted portion 311, and the linear movement of the mounting plate 4 will translate into rotational movement of the lock plate 3. Once the mounting plate 4 has been slid far enough, the lock plate 3 will rotate back to a securing position from the action of the one or more springs 32. In some embodiments, the lever 2 must be actuated for the mounting plate 4 to be fully slid onto the alignment plate 1.

In order to disengage the mounting plate 4 from the sub-assembly 5, the lever 2 is rotated to rotate the lock plate 3. When rotated, the fasteners 31 disengage mounting plate 4 allowing the mounting plate 4 to be slid off the one or more projections 12 and off the alignment plate 1. The one or more projections 12 can prevent the mounting plate 4, and items attached thereto, from trying to rotate as the lever 2 is moved.

One advantage of some of the embodiments is that subassembly is separate from the mounting plate 4. This allows the mounting plate 4 to be attached separately, produced in greater quantities, and preinstalled to the object to be mounted. In critical infrastructure, downtime must be limited. Thus if there is a failure of the mounted item 8, one can save time by having a replacement object pre-fitted with the mounting plate 4. One would not need to remove the mounting plate 4 of the failed object and place it on the replacement object. In some embodiments, the mounting plate 4 is factory installed. In some embodiments, the object will have a backing that is similar to the mounting plate 4 so that the one or more protrusions can be inserted and the one or more fasteners 31 secured thereto.

Figure 2:
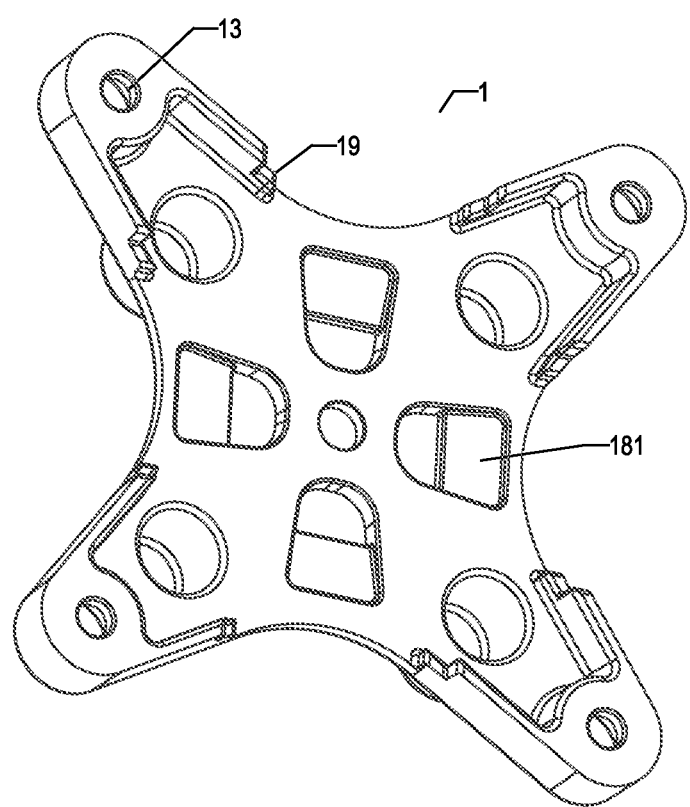

FIG. 1 illustrates a front view of an embodiment of the alignment plate 1 comprising: four projections 12, four mount holes 13, four reliefs 18, four stepped features 19 and a receptacle 17. The projections 12 comprise lead-in features 121. FIG. 2 shows the back of the embodiment of FIG. 1. In FIG. 2, a partial relief 181 is shown. A partial relief 181 can allow for greater range of motion of flexible engagement members 33.

Figure 3:
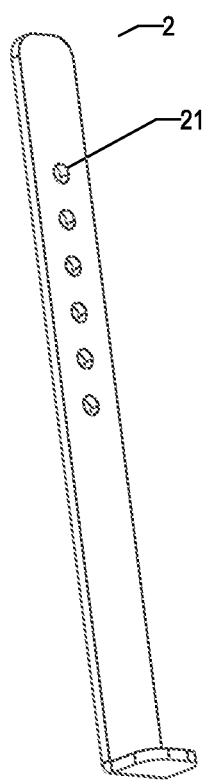
FIG. 3 is an embodiment of a lever.

FIG. 3 illustrates an embodiment of a lever 2. As can be seen, the lever 2 comprises multiple holes 21. It is understood that in other embodiments the holes 21 can be replaced by concave sections that allow the flexible engagement members 33 to engage and rest therein. It is understood that while the lever 2 is shown as a fully removable element, other embodiments are herein disclosed where the lever 2 is integral with the lock plate 3, or secured to, but still movable in relation to the lock plate 3.

Figure 4:
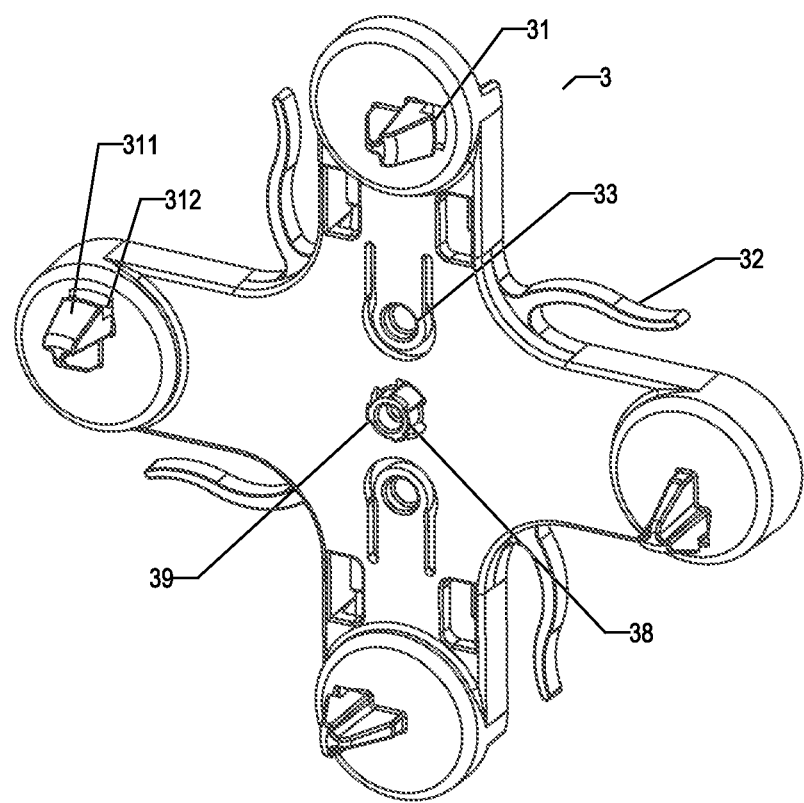
FIGS. 4 and 5 show an embodiment of a lock plate.
Figure 5:
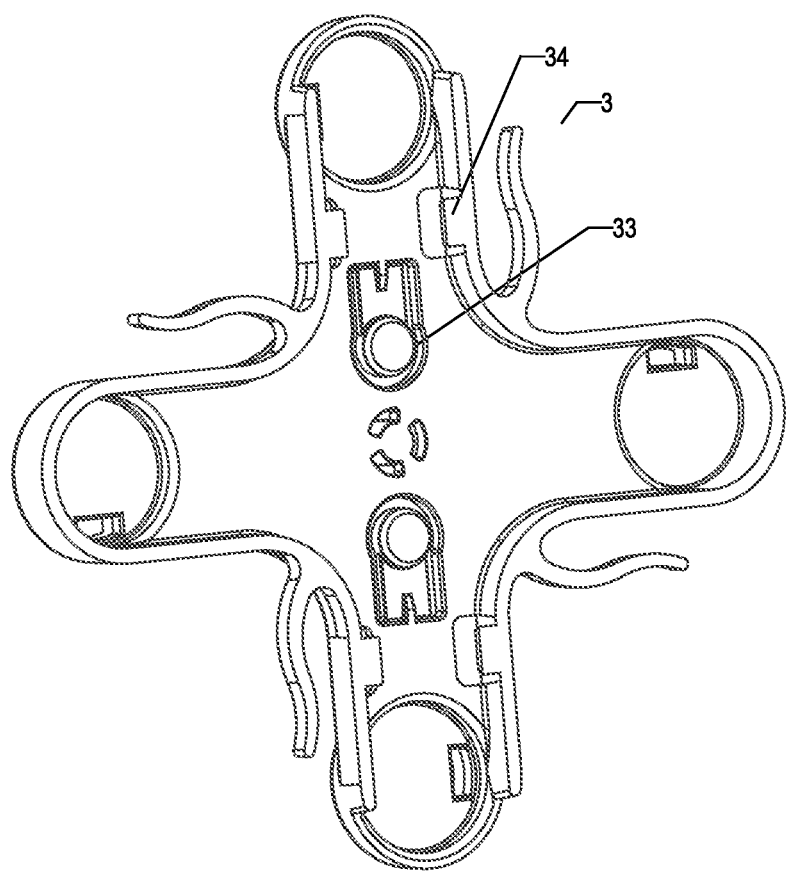

FIGS. 4 and 5 illustrate an embodiment of the lock plate 3. The lock plate 3 comprises fasteners 31, springs 32, flexible engagement members 33, a hub 38. The fasteners 31 can further comprise a slanted portion 311. The fasteners 31, in part, define a gap 312. The edge of the engagement holes 42, when the mounting plate 4 is secured to the lock plate 3, will be located therein. On the back, the guides 34 are shown. The guides 34 act to help secure the lever 2 in an interference fit and or guide the linear movement of the lever 2. The hub 38 is configured to couple the lock plate 3 to the alignment plate 1. It is understood that while the embodiment is shown with four fasteners 31, four springs 32 and two flexible engagement members 33, embodiments that use one or more of these elements are also disclosed.

Figure 6:
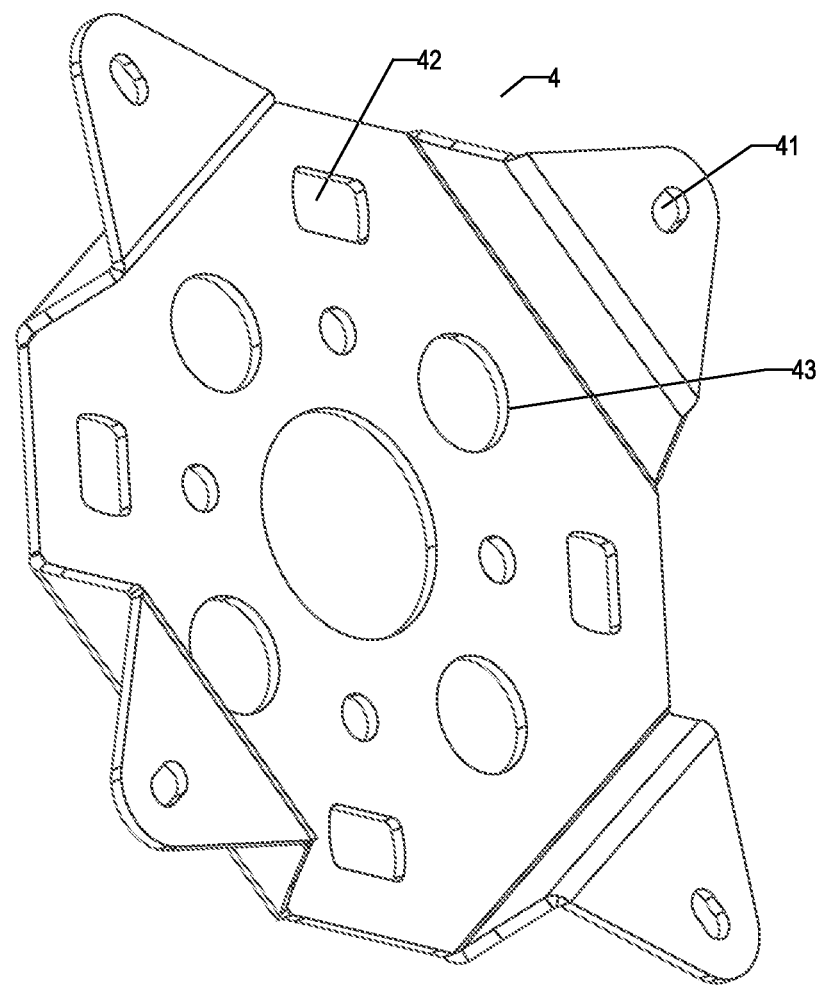
FIGS. 6 and 7 show an embodiment of a mounting plate.
Figure 7:
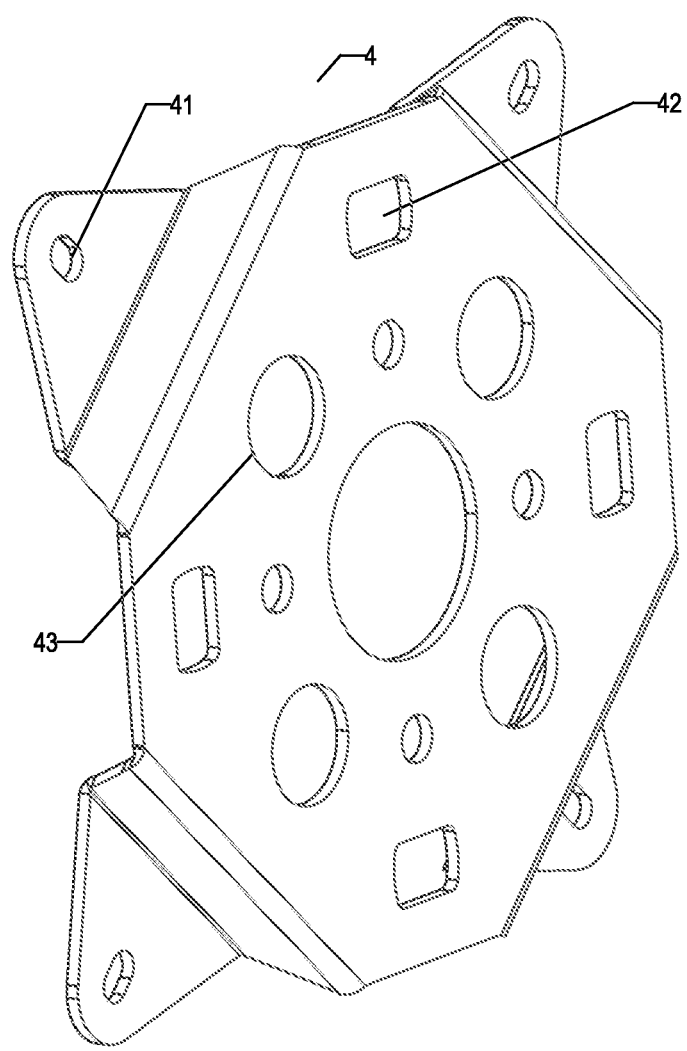

FIGS. 6 and 7 show an embodiment of a mounting plate 4 comprising securing holes 41, engagement holes 42, and alignment holes 43. In some embodiments, the securing holes 41 match a standardized pattern (e.g., Video Electronics Standars Association (VESA)). The alignment holes 43 have a shape that corresponds to the general cross-sectional shape of the projection 12. In some embodiments, the alignment holes 43 have a shape that corresponds to the base of the projection 12.

Figure 8:
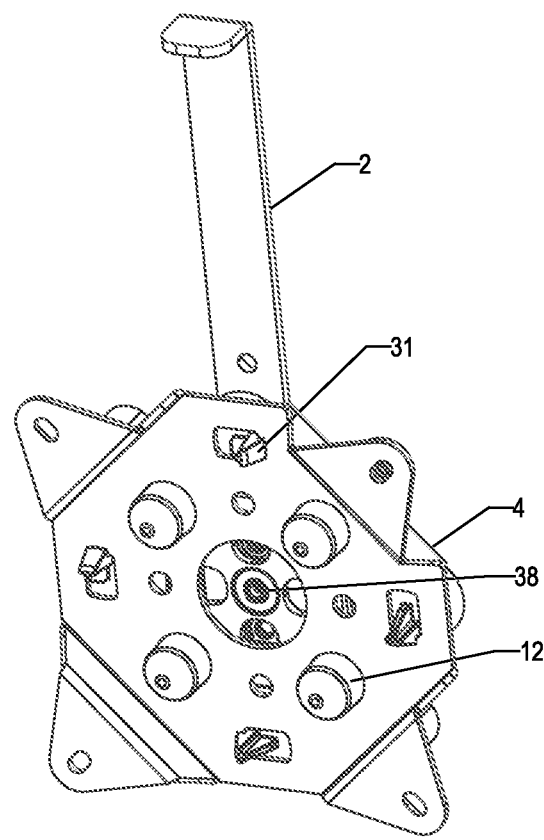
FIGS. 8 and 9 show an embodiment of the lock plate, an alignment plate and a mounting plate secured together.
Figure 9:
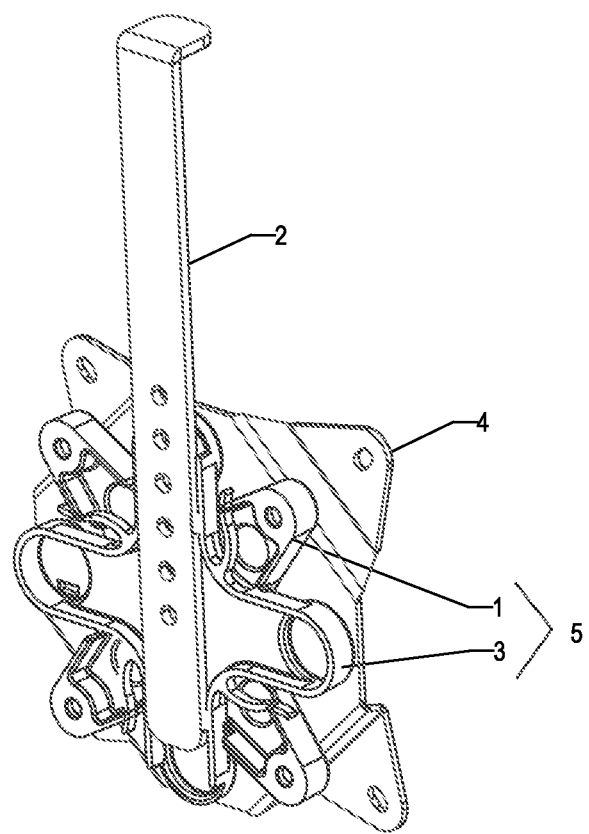

FIGS. 8 and 9 show an embodiment of the lock plate 3, the alignment plate 1 and the mounting plate 4 coupled together. As can be seen, the sub-assembly 5 comprises the alignment plate 1, the lock plate 3, and the lever 2. When the mounting plate 4 is aligned by the alignment plate 1 and slid over the projections 12, the edge of the engagement holes 42 abut the slanted portion 311. When further force is applied, the edge of the engagement hole forces the lock plate 3 to rotate, against the force of the springs 32. In some embodiments, the springs 32 can abut alignment plate 1. In other embodiments, the spring can be a torsion, a compression, or a tension spring. Once the mounting plate 4 is pressed far enough, the lock plate 3 will rotate back to a secured position, by the force of the spring, and a portion of the mounting plate 4 will reside inside the gap 312. The fasteners 31 will secure the mounting plate 4, and any item attached to the mounting plate 4.

Figure 10:
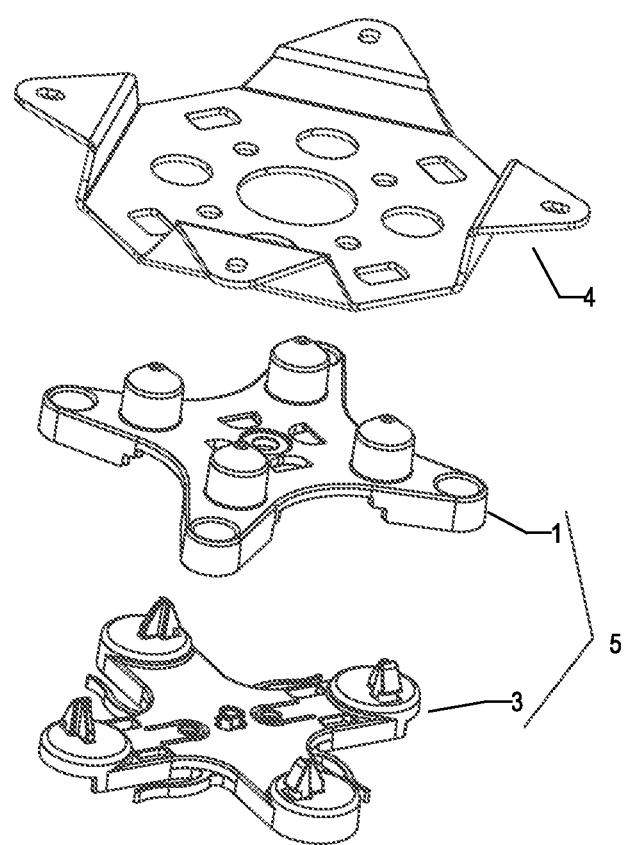
FIG. 10 shows an exploded view of an embodiment of the lock plate, an alignment plate, and a mounting plate.

FIG. 10 shows an exploded view of an embodiment of the mounting plate 4, the alignment plate 1 and the lock plate 3. The lock plate 3 and the alignment plate 1 form the subassembly 5.

Figure 11:
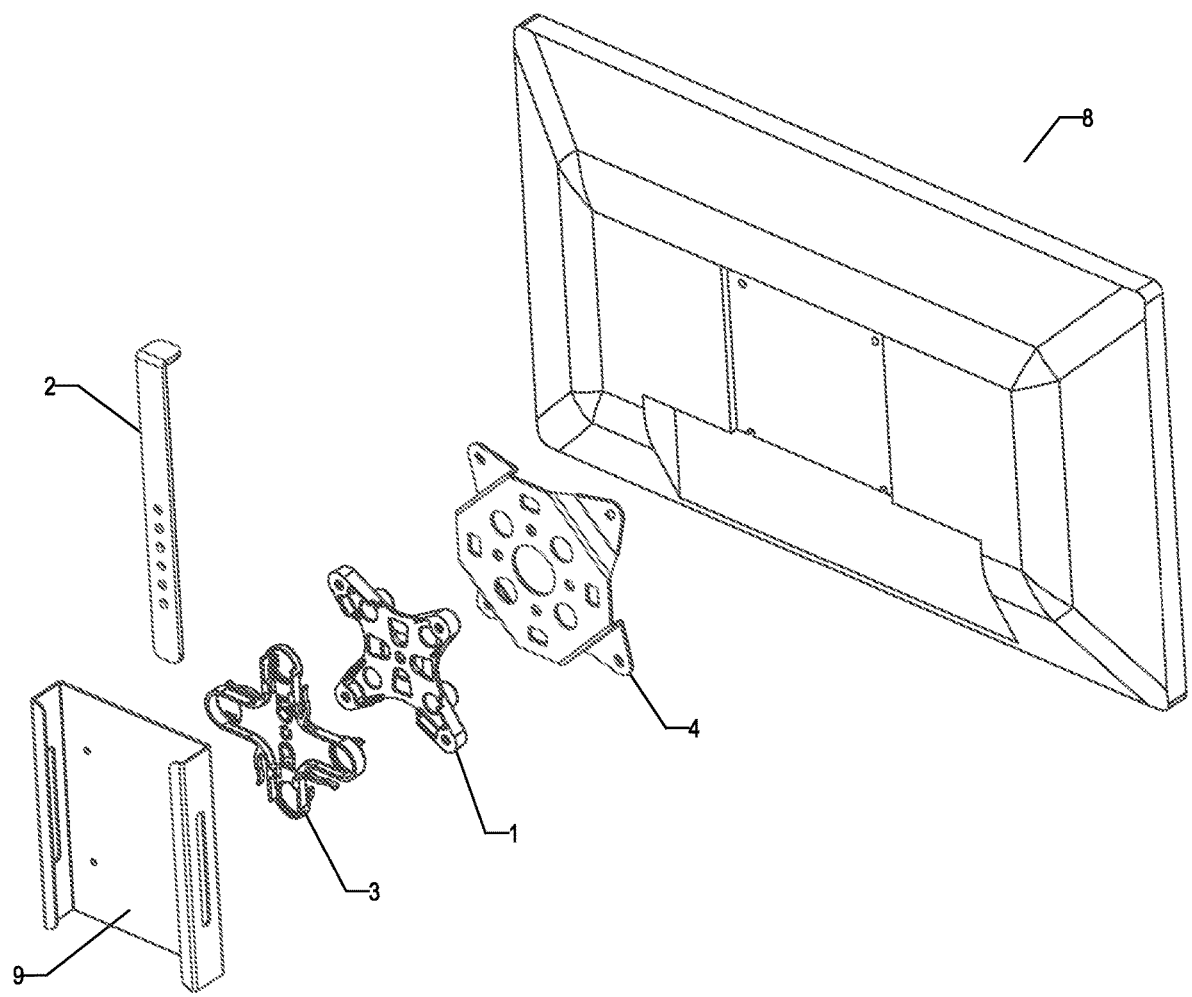
FIG. 11 shows an exploded view of an embodiment with a mount and a monitor.

FIG. 11 shows an embodiment of the lever 2 the lock plate 3, the alignment plate 1 and the mounting plate 4 with a mount 9 and a mounted item 8, in this case, a monitor. The mount holes 13 will engage a mount 9. While the securing of the alignment plate 1 and the mount 9 are shown as corresponding holes 21, it must be understood that other types of engagements can also be used. In some embodiments, either the mount 9 or the alignment plate 1 can have protrusions that create an interference fit between the two. In some embodiments, clips or adhesives are used.

Figure 12:
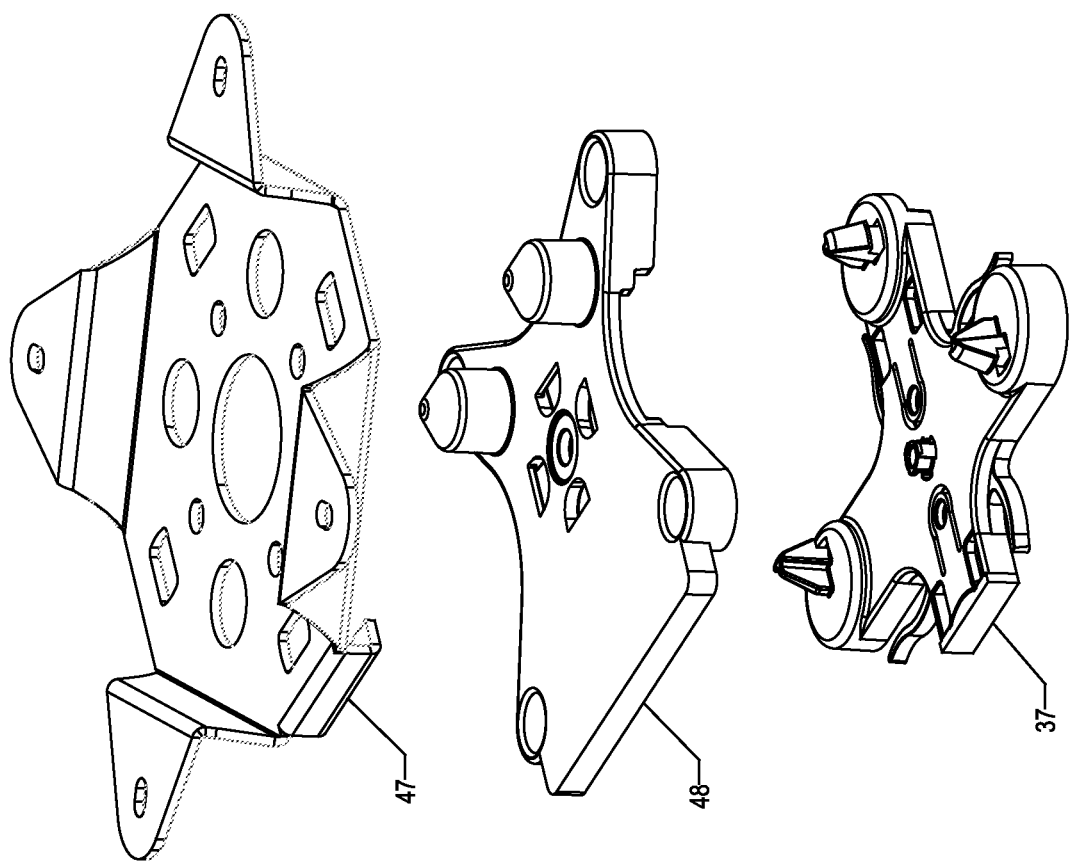
FIG. 12 shows an exploded view of an embodiment of the lock plate, an alignment plate, and a mounting plate.
Figure 13:
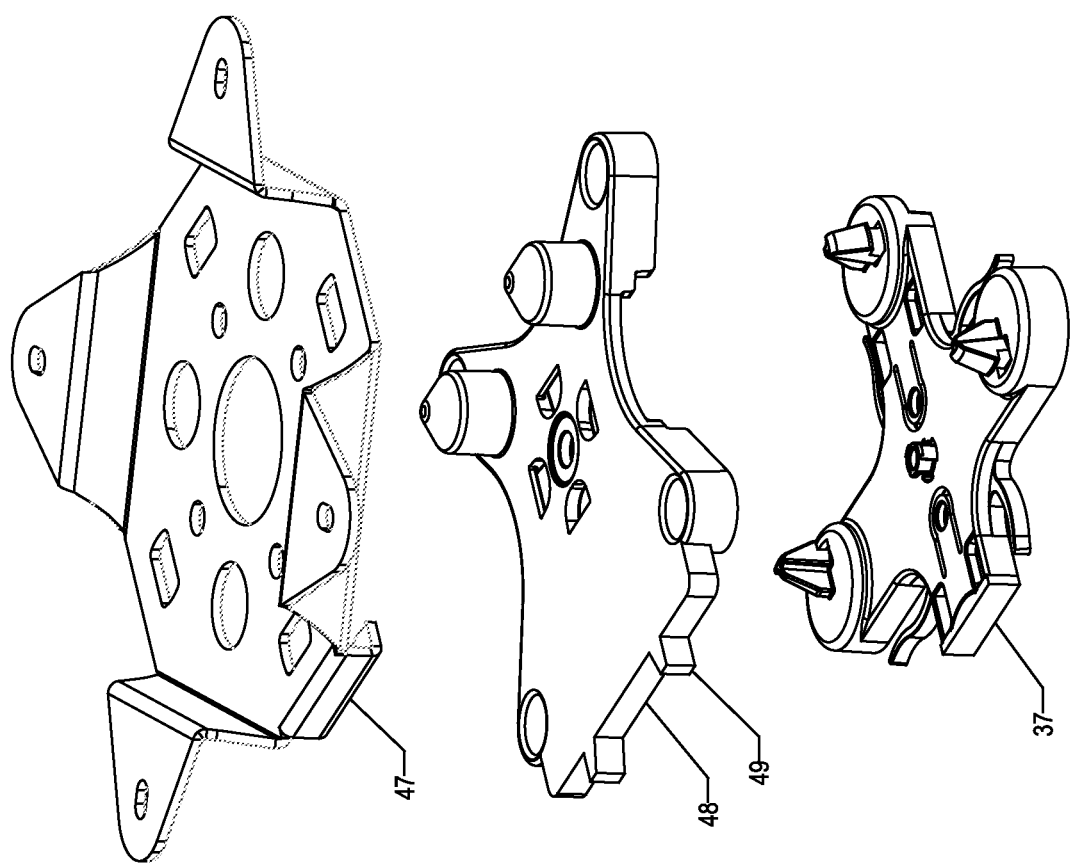
FIG. 13 shows an embodiment similar to FIG. 12 but including ramps.
Figure 14:
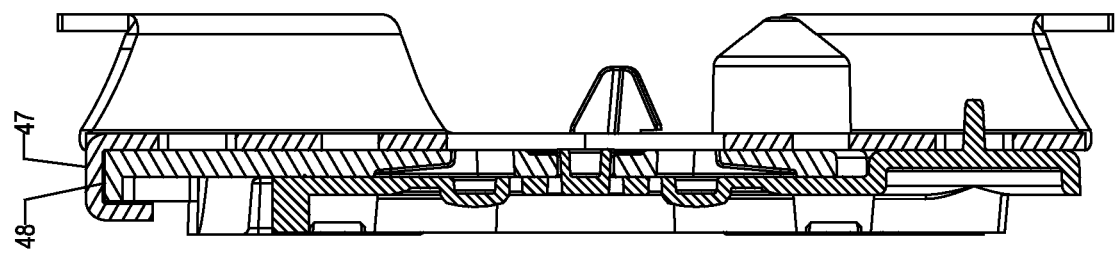
FIG. 14 shows cross-section of an embodiment similar to FIG. 12.

FIG. 12 shows an exploded view of an embodiment of the mounting plate 4, the alignment plate 1 and the lock plate 3. The mounting plate 4 comprises a hanger 47. Typically, the mounting plate 4, with a hanger 47, will be attached to the mounted item 8 such that the hanger 47 is located on the upside of the mounted item 8. During use, it must be understood that some mounted items 8 are much larger than their mounts, and it is sometimes difficult to align with an item behind the mounted item 8. The hanger 47 will help the installer properly locate the alignment plate 1. The installer will angle the mounted item 8 and position the mounted item 8 so that the hanger 47 will catch the hanger platform 48. The hanger platform 48 will serve as the pivot point as the mounting plate 4 is rotated into alignment with the alignment plate 1 and the lock plate 3. As seen in FIG. 13, in some embodiments, the hanger platform 48 may have some ramps 49 that will extend to help guide the hanger 47 into position. The ramps 49 are shown at an angle, it is understood that they may also be set to many different angles, even vertical. It is understood that the other components would be adjusted, in relation to no pivoting embodiments, to allow for the pivoting installation. FIG. 14 shows a cross-section of the mounting plate 4 with a hanger 47, the alignment plate 1 with a hanger platform, and the lock plate 3 with the In some embodiments, the lever 2 can be adjusted in relation to the lock plate 3, and thus the mounted item 8. For example, if a large monitor is used, the lever 2 can extend further from the lock plate 3 for ease of actuation. If a small monitor is used, the effective length of the lever 2 can be adjusted so that it is not seen from the front of the monitor.

In order to release the mounted item 8, a user would rotate the lever 2, and pull the mounted item 8. When the lever 2 is rotated, the fastener 31 will no longer secure the mounting plate 4 inside the gap 312. The mounting plate 4 can be pulled off the alignment plate 1.

In some embodiments, the lever 2 will be attached to the lock plate 3 but offset from the center. In such an embodiment, the lever 2 can be pulled down (or up depending on the design) and cause rotation of the lock plate 3. In some embodiments, the lever 2 would be replaced by a flexible element (e.g., cable, strap).

In some embodiments, there is no lever 2, and the lock plate 3 can be actuated by hand. In some embodiments, the lock plate 3 will have a handle that is positioned to allow a user to rotate the lock plate 3.

In some embodiments, the alignment plate 1 is omitted, the mounting plate 4 comprises the receptacle 17, and the hub 38 is snapped directly into the receptacle 17. The mounting plate 4 is attached to the lock plate 3 by force and rotation. When rotated to a securing position, the fasteners 31 secure the lock plate 3, and when rotated to a release position, the fasteners 31 fit through the engagement holes 42 and the mounting plate 4 can be removed.

In some embodiments, springs 32 are not present, and the lock plate 3 is actuated by a lever 2 or other means of rotation. In some of these embodiments, the lock plate 3 and the alignment plate 1 have a detent engagement that will allow for the lock plate 3 to remain in the released position or securing position.

In some embodiments, the alignment plate 1 is secured to the mounted item 8, and the mounting plate 4 is secured to the mount 9. In some embodiments, the mount 9 will have the mounting holes 21, engagement holes 42, and alignment holes 43.

In some embodiments, there will be an electrical connection between the mounting plate 4 and the mount 9 that can allow for grounding. In some embodiments, this is done with a wired connection. In other embodiments, some or all the components are made of conductive material that will provide a conductive bridge to the mount 9.

In some embodiments, there are one or two projections 12 and two fasteners 31 that are aligned when the lock plate 3 is in the secured position. This would provide for a narrower subassembly 5.

In some embodiments, the lever 2 has at least one wavy edge, and the lock plate 3 has detents that engage the wavy profile as a means to adjust the effective length of the lever 2.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
 a quick connect comprising:
  a mounting plate defining one or more alignment holes and one or more engagement holes; and
  a subassembly, and the sub-assembly comprises:
   an alignment plate comprising one or more projections, and the one or more projections is configured to extend through the alignment holes; and
   a lock plate, rotationally coupled to the alignment plate,
 comprising one or more spring arms and one or more fasteners configured to extend through the one or more engagement holes;
 wherein the quick connect is configured to move between a secured position and a release position by rotating the lock plate in relation to the alignment plate; in the secured position, the at least one the one or more projections extend through one of the one or more alignment holes, at least one of one or more fasteners extend through at least one of the one or more engagement holes and secure the mounting plate to the sub-assembly; and in the release position, the mounting plate is able to be removed from the sub-assembly.

2. The apparatus of claim 1, wherein the one or more spring arms bias the lock plate to the secured position.

3. The apparatus of claim 1, wherein each of the one or more fasteners comprise a slanted portion and at least partially define a gap.

4. The apparatus of claim 1, wherein the lock plate further comprises a flexible engagement member.

5. The apparatus of claim 1, wherein the lock plate further comprises one or more guides.

6. The apparatus of claim 5, further comprising a lever and the lever abuts at least one of the one or more guides.

7. The apparatus of claim 1, further comprising a lever coupled to the lock plate.

8. The apparatus of claim 7, wherein the lever defines one or more holes; and the lock plate further comprises one or more detents configured to engage the one or more holes.

9. The apparatus of claim 7, wherein the lever defines one or more depressions; and the lock plate further comprises one or more detents configured to engage the one or more depressions.

10. The apparatus of claim 7, wherein the lever has at least one side with a wavy shape; and the lock plate further comprises one or more detents configured to engage the wavy shape so as to for linear movement and securing of the lever.

11. The apparatus of claim 1, wherein the alignment plate further comprises one or more mounting holes.

12. The apparatus of claim 1, wherein the alignment plate further comprises one or more stepped features, wherein each spring abuts one of the one or more stepped features.

13. The apparatus of claim 1, wherein the one or more projections comprise a base and a lead-in feature.

14. The apparatus of claim 1, wherein the one or more fasteners comprise a slanted portion and at least partially define a gap, and a portion of the mounting plate is located in the gap in the secured position.

15. The apparatus of claim 1, wherein the mounting plate further comprises a hanger.

16. The apparatus of claim 1, wherein the lock plate further comprises a hanger platform.

17. The apparatus of claim 1, wherein the lock plate further comprises a hanger platform and one or more guides adjacent to the hanger platform.

18. The apparatus of claim 15, wherein the lock plate further comprises a hanger platform.

19. The apparatus of claim 15, wherein the lock plate further comprises a hanger platform and one or more ramps adjacent to the hanger platform.

* * * * *